United States Patent
Vemulapati et al.

(10) Patent No.: US 10,449,896 B1
(45) Date of Patent: Oct. 22, 2019

(54) VEHICLE LIGHT ASSEMBLY HAVING DEFORMABLE LENS

(71) Applicant: Ford Global Technologies, LLC, Dearborn, MI (US)

(72) Inventors: Satyanarayana Raju Vemulapati, Westland, MI (US); Steven J. Antilla, Brighton, MI (US); Jason Robert Emrich, Sterling Heights, MI (US); Christopher Craft, Royal Oak, MI (US); Linsheng Chen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/238,038

(22) Filed: Jan. 2, 2019

(51) Int. Cl.
| | |
|---|---|
| B60Q 3/60 | (2017.01) |
| B60Q 3/74 | (2017.01) |
| B60Q 3/82 | (2017.01) |
| F21V 5/04 | (2006.01) |
| B60Q 3/76 | (2017.01) |
| F21V 14/04 | (2006.01) |
| B60Q 3/85 | (2017.01) |
| F21W 106/00 | (2018.01) |

(52) U.S. Cl.
CPC ............... *B60Q 3/60* (2017.02); *B60Q 3/74* (2017.02); *B60Q 3/76* (2017.02); *B60Q 3/82* (2017.02); *B60Q 3/85* (2017.02); *F21V 5/04* (2013.01); *F21V 14/04* (2013.01); *F21W 2106/00* (2018.01)

(58) Field of Classification Search
CPC .......... F21V 14/06; F21V 17/02; B60Q 3/60; B60Q 3/74; B60Q 3/76; B60Q 3/82; B60Q 3/85
See application file for complete search history.

(56) References Cited

U.S. PATENT DOCUMENTS

| | | | | |
|---|---|---|---|---|
| 4,444,471 A | * | 4/1984 | Ford, Jr. | G02B 26/0875 359/666 |
| 6,092,917 A | | 7/2000 | Litke et al. | |
| 8,449,156 B2 | * | 5/2013 | Salter | B60R 13/02 362/276 |
| 8,632,217 B2 | * | 1/2014 | Zeng | F21L 4/005 362/277 |
| 9,199,575 B2 | | 12/2015 | Ovenshire et al. | |
| 9,738,219 B1 | * | 8/2017 | Salter | B60Q 3/80 |
| 10,093,226 B1 | | 10/2018 | Lopez Gonzalez | |
| 2006/0092649 A1 | * | 5/2006 | Bynum | B60Q 3/51 362/488 |
| 2011/0242832 A1 | * | 10/2011 | Maruyama | H01H 23/025 362/512 |
| 2013/0170220 A1 | * | 7/2013 | Bueeler | F21K 9/00 362/296.01 |
| 2018/0017246 A1 | * | 1/2018 | Lau | F21V 31/005 |

* cited by examiner

*Primary Examiner* — Alexander K Garlen
(74) *Attorney, Agent, or Firm* — Vichit Chea; Price Heneveld LLP

(57) ABSTRACT

A vehicle light assembly is provided that includes a light source, a deformable inner lens operatively coupled to the light source, and a movable outer lens configured to deform the inner lens, wherein in a first position the inner lens has a first shape and in a second position the inner lens is deformed to a second shape to change the beam pattern.

19 Claims, 4 Drawing Sheets

VEHICLE LIGHT ASSEMBLY HAVING DEFORMABLE LENS

FIELD OF THE INVENTION

The present invention generally relates to vehicle lighting, and more particularly relates to a user selectable vehicle light assembly, such as a map/reading light assembly having variable optics.

BACKGROUND OF THE INVENTION

Motor vehicles, such as wheeled vehicles, are commonly equipped with a variety of interior lighting devices for illuminating the passenger compartment. For example, automotive vehicles typically include a dome lamp for providing light illumination when one or more vehicle doors are opened to provide general area lighting for occupants of the vehicle. Additionally, motor vehicles are commonly equipped with a plurality of reading lamps that provide lighting to better enable passengers to read, view maps, and otherwise aid in vision within the passenger compartment. Dome and reading lights are typically fixed in or near the headliner or in an overhead console and typically direct light in a fixed direction and within a fixed beam pattern. To achieve multiple beam patterns, a plurality of light sources and optics may be employed. It would be desirable to provide for an enhanced lighting system that offers enhanced lighting in the vehicle.

SUMMARY OF THE INVENTION

According to one aspect of the present invention, a vehicle light assembly is provided. The vehicle light assembly includes a light source, a deformable inner lens operatively coupled to the light source, and a movable outer lens configured to deform the inner lens, wherein in a first position the inner lens has a first shape and in a second position the inner lens is deformed to a second shape.

Embodiments of the first aspect of the invention can include any one or a combination of the following features:
  the deformable inner lens is configured to have a first relaxed shape as the first shape for providing focused light in a first beam pattern and is deformable to the second deformed shape to provide scattered light in a second beam;
  the deformable inner lens comprises a near field lens;
  the deformable inner lens comprises silicone;
  the movable outer lens comprises a rigid lens that includes a member that pushes on the deformable inner lens when in the second position;
  the movable outer lens comprises a boss;
  the vehicle light assembly further has a push latch switch mechanism for holding the movable outer lens in position relative to the deformable inner lens in either of the first or second positions;
  the switch mechanism further turns the light source on and off;
  the lighting assembly provides a reading light in the first position and a dome light in the second position; and
  the deformable inner lens has a convex shape on a front side in the first position and a concave shape in the second position.

According to another aspect of the present invention, a vehicle light assembly is provided. The vehicle light assembly includes a light source, a deformable inner lens operatively coupled to the light source, and a movable outer lens that is movable from a first position to a second position to deform the inner lens and generate a change in a beam pattern.

Embodiments of the second aspect of the invention can include any one or a combination of the following features:
  the deformable inner lens is configured to have a first relaxed shape for providing focused light in a first beam pattern and is deformable to a second deformed shape to provide scattered light in a second beam pattern;
  the deformable inner lens comprises a near field lens;
  the deformable inner lens comprises silicone;
  the movable outer lens comprises a rigid lens that includes a member that pushes on the deformable inner lens when in the second position;
  the movable outer lens comprises a boss;
  the vehicle light assembly further has a push latch mechanism for holding the movable outer lens in position relative to the deformable inner lens in either of the first or second positions;
  the switch mechanism further turns the light source on and off;
  the lighting assembly provides a reading light in the first position and a dome light in the second position; and
  the deformable inner lens has a convex shape on a front side in the first position and a concave shape in the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
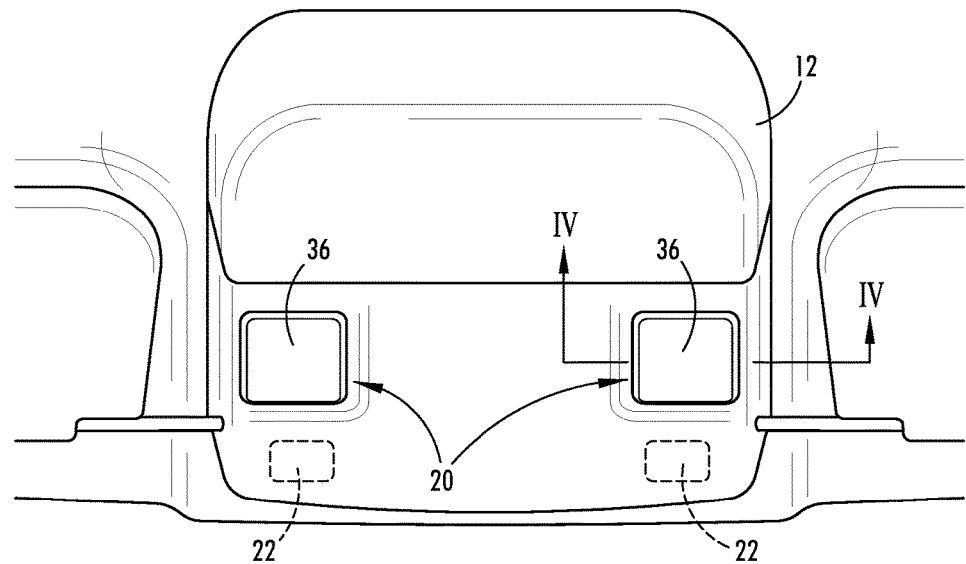
FIG. 2 is an enlarged front view of the overhead console further illustrating the light assemblies.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
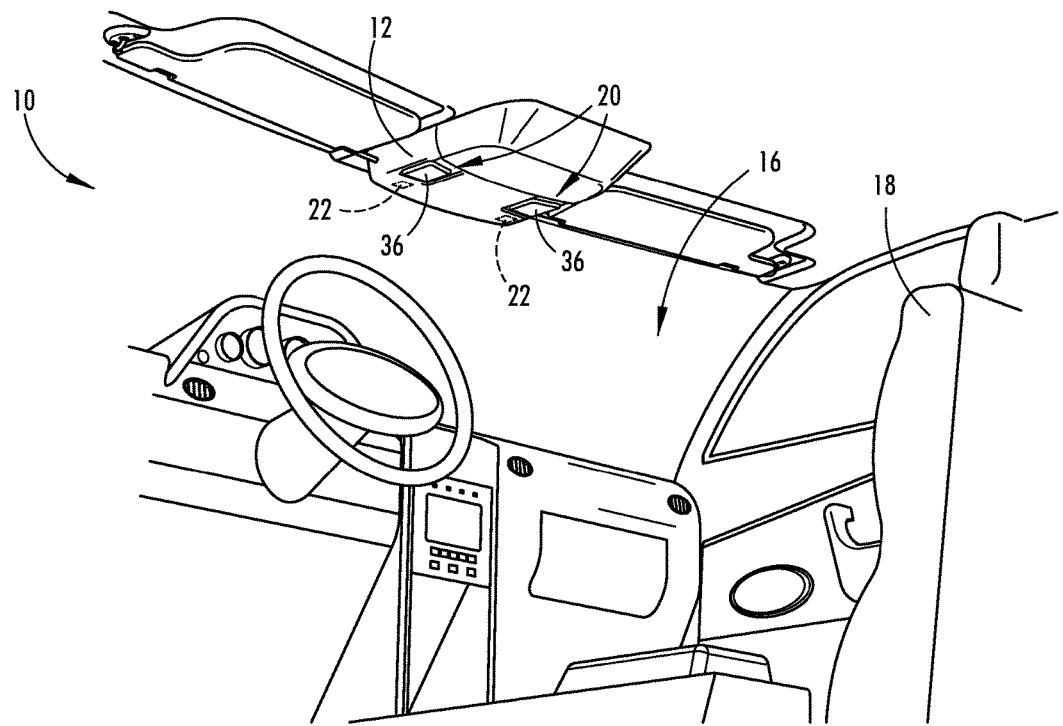
FIG. 1 is a perspective view of a passenger compartment of a motor vehicle having light assemblies located in an overhead console, according to one embodiment.

Referring now to FIG. 1, the passenger compartment 18 of a motor vehicle 10 is generally illustrated having a pair of light assemblies 20, according to one embodiment. The vehicle 10 generally includes an overhead console 12 assembled to the interior side of the roof or ceiling of the passenger compartment 16, generally shown in the headliner 14 above the passenger seating area. The vehicle 10 also includes passenger seats 18 each adapted to hold a driver or other passenger for seating within the passenger compartment 16. Passengers may enter and exit from the vehicle 10 via side passenger doors, each of which may operatively engage a dome lighting input switch which switches state based on whether the door is in the open position or closed position and activates the dome lighting when the door is in the open position. Additionally, a dashboard mounted user input switch may be provided on the dashboard or elsewhere in the vehicle and is generally accessible to the driver of the vehicle for controlling lights, including turning on and off one or more light assemblies 20.

The light assembly 20 may operate as a dome light (lamp) and/or reading light (lamp) to illuminate lighting within the interior of the passenger compartment 16 of the vehicle 10. The term "dome light" is recognized in the vehicle interior lighting art as a light that provides general area lighting. The term "reading light" is interchangeable with the term "map light" and both terms are known in the art for providing more focused light such as to enable passengers to read and view maps. In the embodiment shown, the vehicle 10 includes at least one light assembly 20 assembled to the interior of the vehicle 10 and the light assembly 20 is user selectable to vary the light output between a focused light beam that may serve as a reading light and a scattered light beam that may serve as a dome light. The light assembly 20 may thereby serve as a dome light or a reading light based on a user selectable input. The vehicle may be equipped with a plurality of such light assemblies 20 and one or more of the light assemblies 20 may be located elsewhere on the vehicle 10 such as in a rear overhead console 16, a door, a support pillar, a trim panel or near the lateral sides of the headliner 12.

In the specific embodiment shown and described herein, one of the light assemblies 20 may be configured to direct light in a first light beam to illuminate the area proximate to a front driver seat of the vehicle 10 where a driver may be seated. The other of the light assemblies 20 may be configured to illuminate light in a separate second light beam to illuminate the area proximate a front seat for a passenger of the vehicle seated on one side of the driver seat. As such, each of the light assemblies 20 in this example are dedicated to illuminating light in particular seating areas and may be activated by an occupant such as a driver or passenger of the vehicle to turn the light assemblies 20 on or off and further to select between a focused light beam output and a scattered light beam output as described herein.

Figure 3:
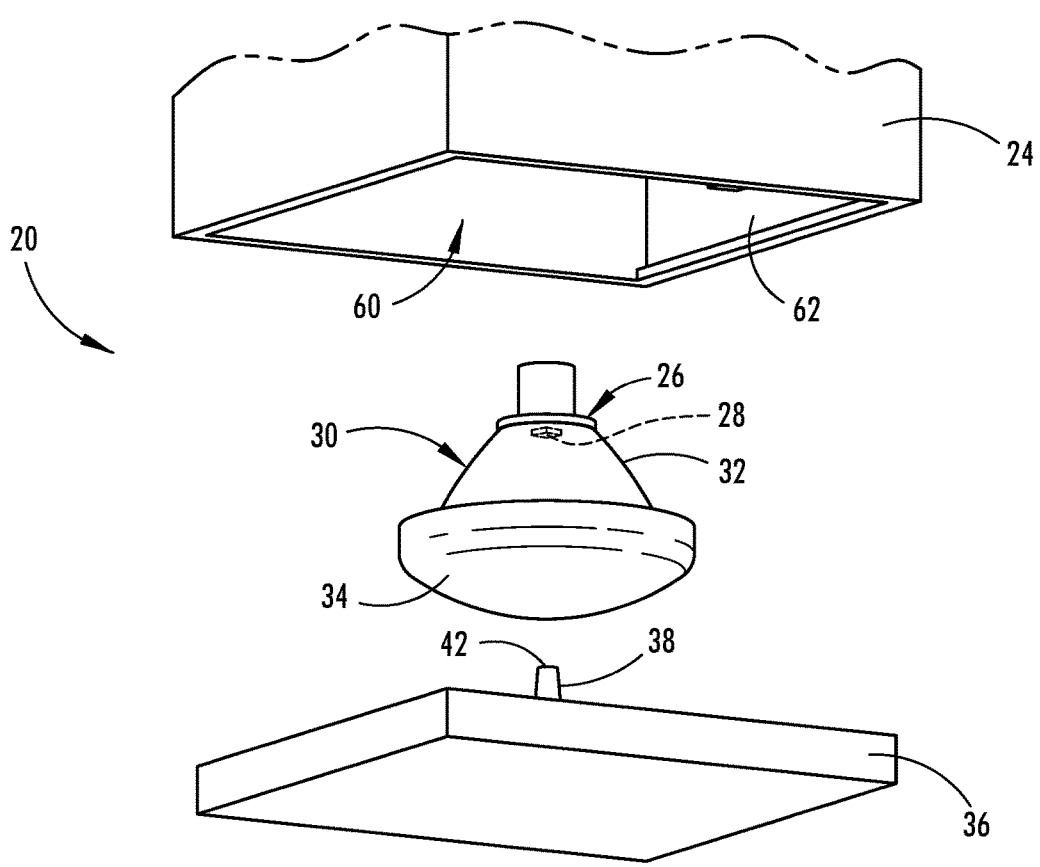
FIG. 3 is an exploded view of one of the light assemblies shown in FIG. 2.

Referring to FIG. 3, the light assembly 20 is generally illustrated having a housing 24 which may be supported on or within the overhead console, according to one embodiment. The housing 20 includes a top wall and lateral side walls that define an enclosure 60 with an open front end. The top wall may have an opening and structure for receiving and supporting a flexible and deformable inner lens 30. At the rear of the deformable inner lens 30 is a printed circuit board (PCB) 26 that supports a light source 28 which in one embodiment is a light-emitting diode (LED). The light source 28 is mounted on the printed circuit board 26 which supplies power from an energy supply, e.g., vehicle battery, via circuit elements such as circuit traces to the light source 28. The light source 28 is shown generally positioned centered about the deformable inner lens 30 and oriented to direct light output from the light source 28 forward through a front surface 34 of the deformable inner lens 30.

The light assembly 20 further includes an outer lens 36 optically aligned with and positioned forward of the deformable inner lens 32 such that light emitted from the light source 28 passes through the deformable inner lens 30 and through the outer lens 36. The outer lens 36 is supported within a recess 62 in lateral side walls of the housing 24. The outer lens 36 may move rearward by sliding within the recess 62 from a forward first position rearward to a second position to engage and deform a portion of the deformable inner lens 30 and activate a switch 44 and may move forward within the recess 62 away from the inner lens 30. The outer lens 36 is a movable outer lens that is rigid and includes a rearward extending member configured in one embodiment as a boss 38 that pushes on the deformable inner lens 30 when in a second position. The boss 38 thereby serves as a push member to contact contact surface 42 and push on the deformable inner lens 30 when moved to the second position. As such, the boss 38 may be a rearward extending member from the outer lens 36 that is positioned to engage the forward surface of the deformable inner lens 30 at the contact surface 42.

The flexible and deformable inner lens 30 is shown in one embodiment generally having a bell-shape having conical side walls 32 on the rear portion and having a rounded bowl shape or convex front surface 34 as viewed from the front side in the normal undeformed state. The inner lens 30 may include a near field lens that optically transmits light through the front surface 34. The inner lens 30 is a deformable optic lens that deforms, particularly on the front surface 34, when boss 38 applies rearward force on the front surface 34 when the outer lens is in the second position. The deformable inner lens 30 is formed of a moldable silicone, such as a moldable optical silicon that is light transparent and thus allows light rays to pass therethrough, particularly through the front surface 34, according to one embodiment. On example of moldable silicone is commercially available from Dow Chemical Company under the brand Bowsil™ MS-1001 moldable silicone. The deformable inner lens 30 changes shape on the front surface 34 when the inner lens 30 is deformed by the boss 38. Due to the change in shape of the front surface 34, the light rays transmitted through the front surface 34 of the inner lens 30 vary in direction and scatter when in the deformed shape.

Figure 4:
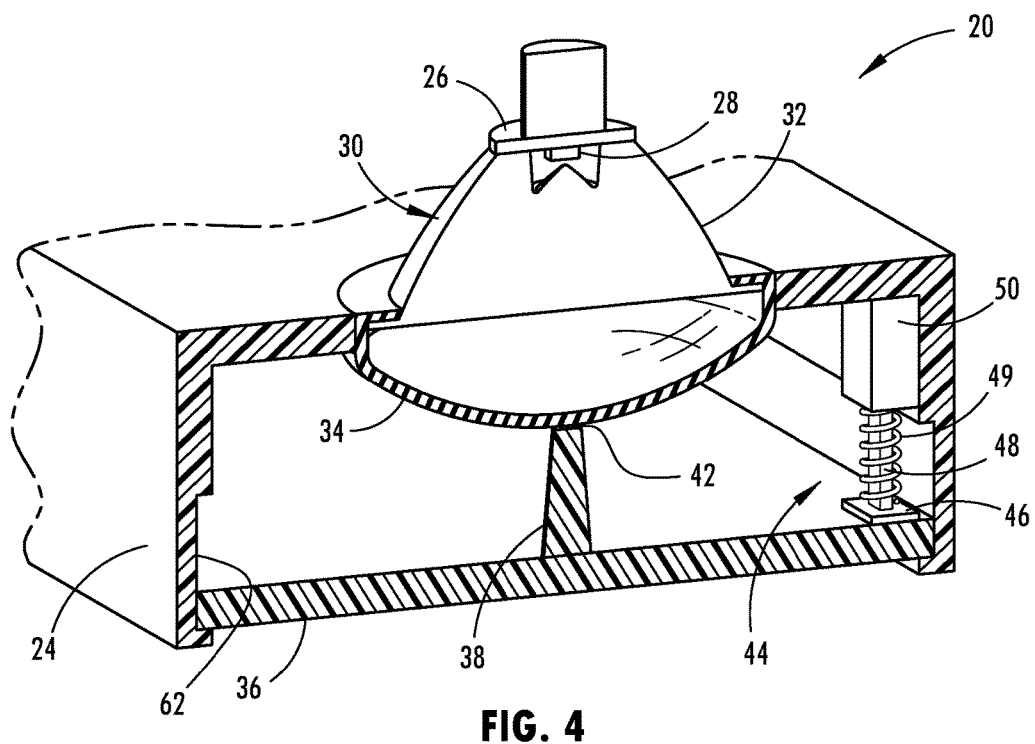
FIG. 4 is a cross-sectional view taken through line IV-IV of FIG. 2 further illustrating the light assembly.
Figure 5:
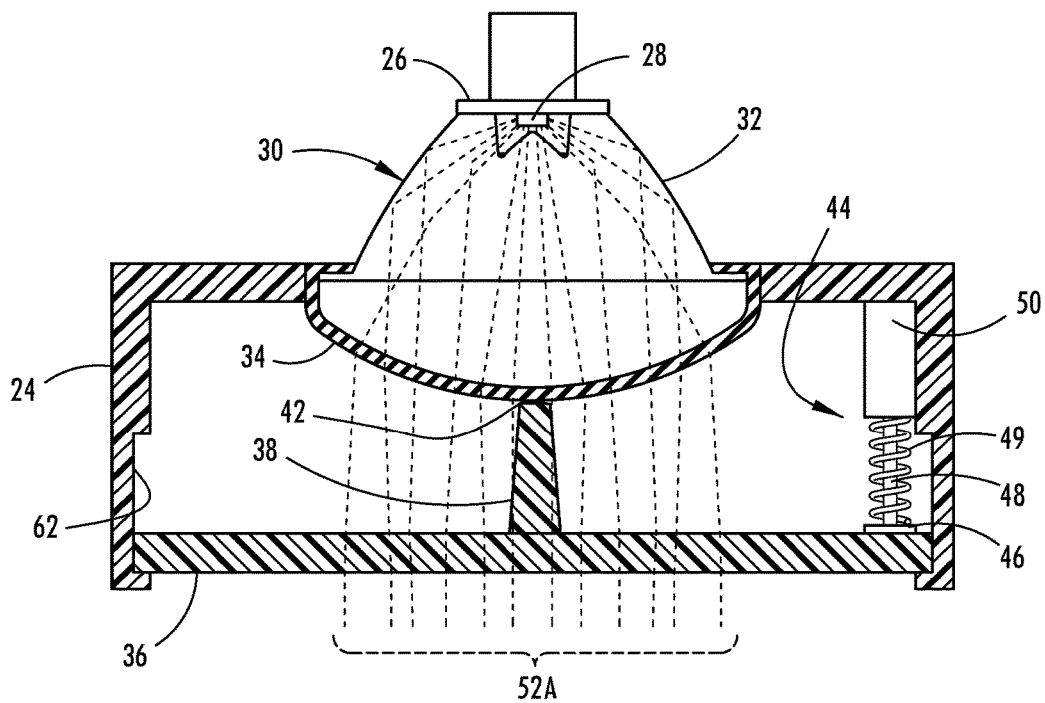
FIG. 5 is a cross-sectional view of the light assembly shown in FIG. 4 further illustrating the focused light output in a non-deformed first position of the deformable inner lens.

In the first position, the outer lens 36 and boss 38 are extended fully forward away from the inner lens 30 such that the inner lens 30 is not deformed as shown in FIGS. 4 and 5. In this position, light rays emitted from the light source 28 pass through the non-deformed inner lens 30 in a focused light beam 52A having collimated light rays which then also pass through the outer lens 36. The focused light beam 52A therefore may serve as a reading lamp with a focused beam to provide a narrower and more focused light output beam pattern such as for reading.

Figure 6:
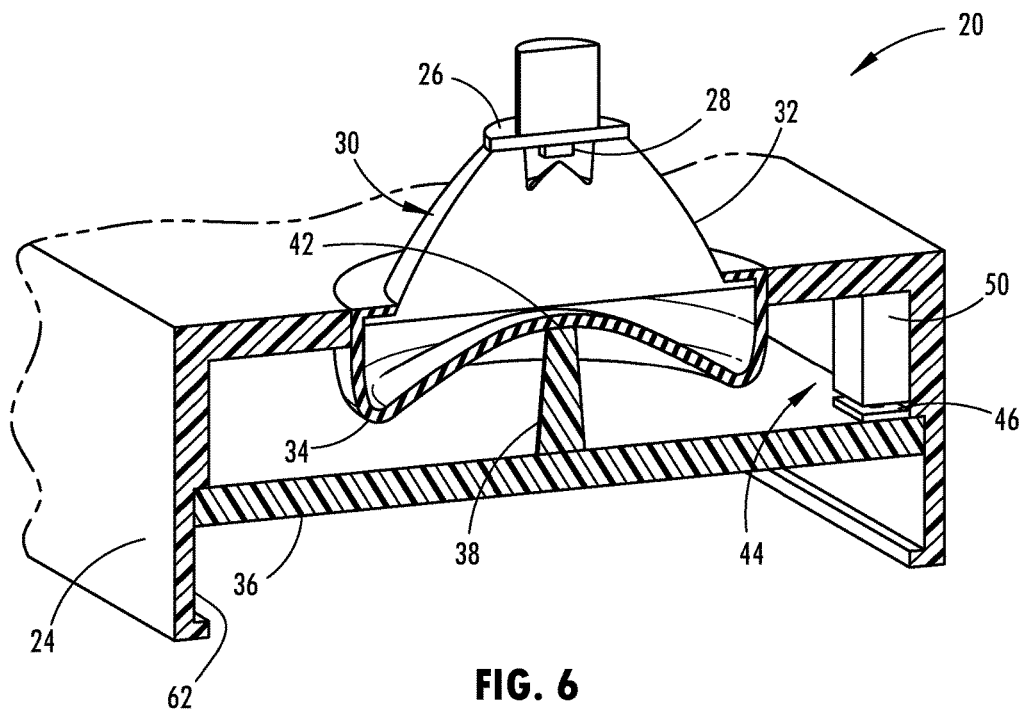
FIG. 6 is a cross-sectional view of the light assembly further illustrating the deformable inner lens in a deformed second position.
Figure 7:
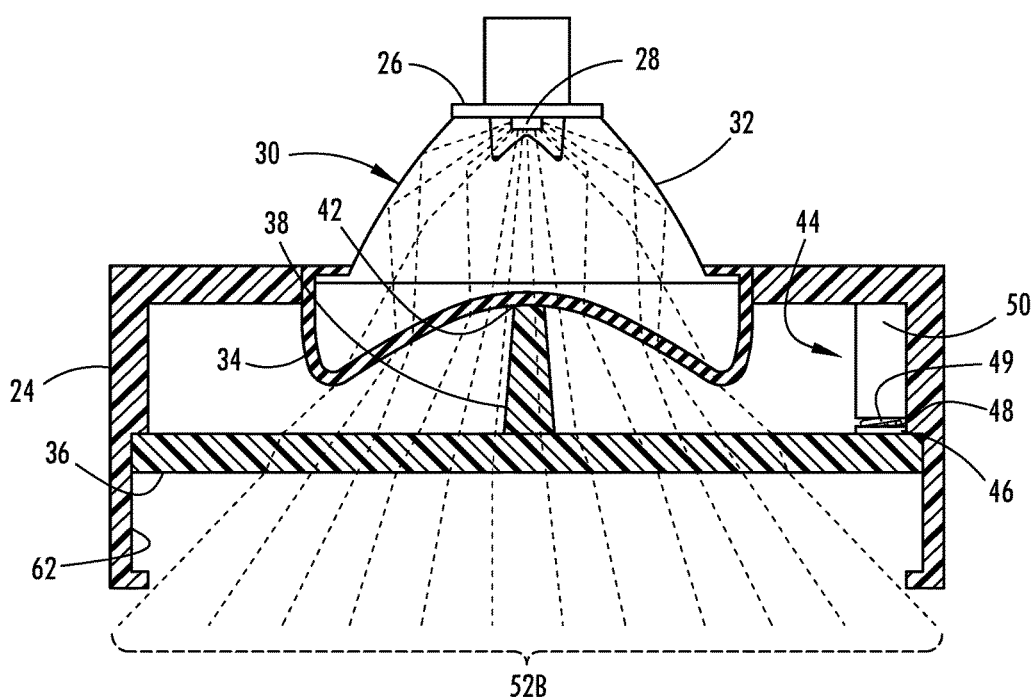
FIG. 7 is a cross-sectional view of the lighting assembly further illustrating the scattered light rays output from the light assembly when the deformable inner lens is in the deformed second position.

When the outer lens 36 is pressed forward by a user to the second position such that the boss 38 engages and deforms the forward surface 34 of the deformable inner lens 30, the forward surface 34 deforms to form a concave shape on the front surface 34 as viewed from the front side which causes light rays emitted by the light source 28 to defocus or scatter within scattered light beam 52B, as shown in FIGS. 6 and 7. The scattered rays of scattered light beam 52B are emitted through the deformed inner lens 30 and the outer lens 36 to provide a scattered wider beam coverage which is defocused and may serve as a general purpose or dome lamp, for example.

The light assembly 20 may include a push latch switch mechanism such as three position toggle switch 44, according to a first embodiment. In this embodiment, the three position toggle switch 44 may include a first member 46 having a contact member 48 that engages a second member 50 within the housing 24. When the outer lens 36 is in the forward extended first position, the light source 28 is turned off and the inner lens 38 is not deformed as shown in FIGS. 4 and 5. When a user depresses on the outer lens 36 to push the outer lens 36 rearward, the toggle switch 44 may move to an on position that turns on the light source 28. When a user depresses on the toggle switch 44 to a second position, the outer lens 36 may move rearward further to a second position as shown in FIGS. 6 and 7 in which the boss pushes on the inner lens 30 such that the inner lens 30 is deformed to provide scattered light rays. When a user further depresses on the toggle switch 44 for a third time, the outer lens 30 is released such that the outer lens 30 is returned by a spring 49 to the initial forward position and the light source 28 is turned off. The toggle switch 44 may include a cam surface that engages the contact member 48 in the various positions. It should be appreciated that other switches may be employed according to other embodiments.

According to another embodiment, the toggle switch may be a two position toggle switch and the light assembly 20 may employ a separate on/off switch 22 to turn the light source 28 on and off. With a two position toggle switch, the toggle switch may be designed so that a user depressing on the outer lens 36 to move the outer lens 30 to the second position causes the inner lens 30 to be deformed to provide a scattered ray output, and second depression of the toggle switch to return the outer lens 36 to the forward extended position with inner lens 20 in the non-deformed position. It should be appreciated that other switch arrangements may be employed for turning the light source 28 on and off and for holding the outer lens 36 in either of the first or second positions.

Accordingly, the vehicle light assembly 20 advantageously provides for vehicle lighting in a passenger compartment of the vehicle that may be varied between a focused light beam and a scattered light beam. For example, the light assembly 20 may serve as both a reading light with a focused beam and a dome light with a scattered light beam output. The light assembly 20 advantageously may employ fewer lighting components such as a single light source and a deformable inner lens and a rigid outer lens to achieve varying light output patterns within the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle light assembly comprising:
   a light source;
   a deformable inner lens operatively coupled to the light source; and a movable outer lens configured to deform the inner lens, wherein in a first position the inner lens has a first shape and in a second position the inner lens is deformed to a second shape, wherein light from the light source passes sequentially through the inner lens and the outer lens.

2. The vehicle light assembly of claim 1, wherein the deformable inner lens is configured to have a first relaxed shape as the first shape for providing focused light in a first beam pattern and is deformable to the second deformed shape to provide scattered light in a second beam.

3. The vehicle light assembly of claim 1, wherein the deformable inner lens comprises a near field lens.

4. The vehicle light assembly of claim 1, wherein the deformable inner lens comprises silicone.

5. The vehicle light assembly of claim 1, wherein the movable outer lens comprises a rigid lens that includes a member that pushes on the deformable inner lens when in the second position.

6. The vehicle light assembly of claim 5, wherein the movable outer lens comprises a boss.

7. The vehicle light assembly of claim 1 further comprising a push latch switch mechanism for holding the movable outer lens in position relative to the deformable inner lens in either of the first or second positions.

8. The vehicle light assembly of claim 7, wherein the switch mechanism further turns the light source on and off.

9. The vehicle light assembly of claim 1, wherein the lighting assembly provides a reading light in the first position and a dome light in the second position.

10. The vehicle light assembly of claim 1, wherein the deformable inner lens has a convex shape on a front side in the first position and a concave shape on the front side in the second position.

11. A vehicle light assembly comprising:
a light source;
a deformable inner lens operatively coupled to the light source; and
a movable outer lens that is movable from a first position to a second position to deform the inner lens and generate a change in a beam pattern, wherein the movable outer lens comprises a rigid lens that includes a member that pushes on the deformable inner lens when in the second position.

12. The vehicle light assembly of claim 11, wherein the deformable inner lens is configured to have a first relaxed shape for providing focused light in a first beam pattern and is deformable to a second deformed shape to provide scattered light in a second beam pattern.

13. The vehicle light assembly of claim 11, wherein the deformable inner lens comprises a near field lens.

14. The vehicle light assembly of claim 11, wherein the deformable inner lens comprises silicone.

15. The vehicle light assembly of claim 11, wherein the movable outer lens comprises a boss.

16. The vehicle light assembly of claim 11 further comprising a push latch mechanism for holding the movable outer lens in position relative to the deformable inner lens in either of the first or second positions.

17. The vehicle light assembly of claim 16, wherein the switch mechanism further turns the light source on and off.

18. The vehicle light assembly of claim 11, wherein the lighting assembly provides a reading light in the first position and a dome light in the second position.

19. The vehicle light assembly of claim 11, wherein the deformable inner lens has a convex shape on a front side in the first position and a concave shape on the front side in the second position.

* * * * *